Dec. 2, 1930.  H. A. JACOB  1,783,379
LIQUID DISPENSING APPARATUS
Filed Jan. 16, 1930
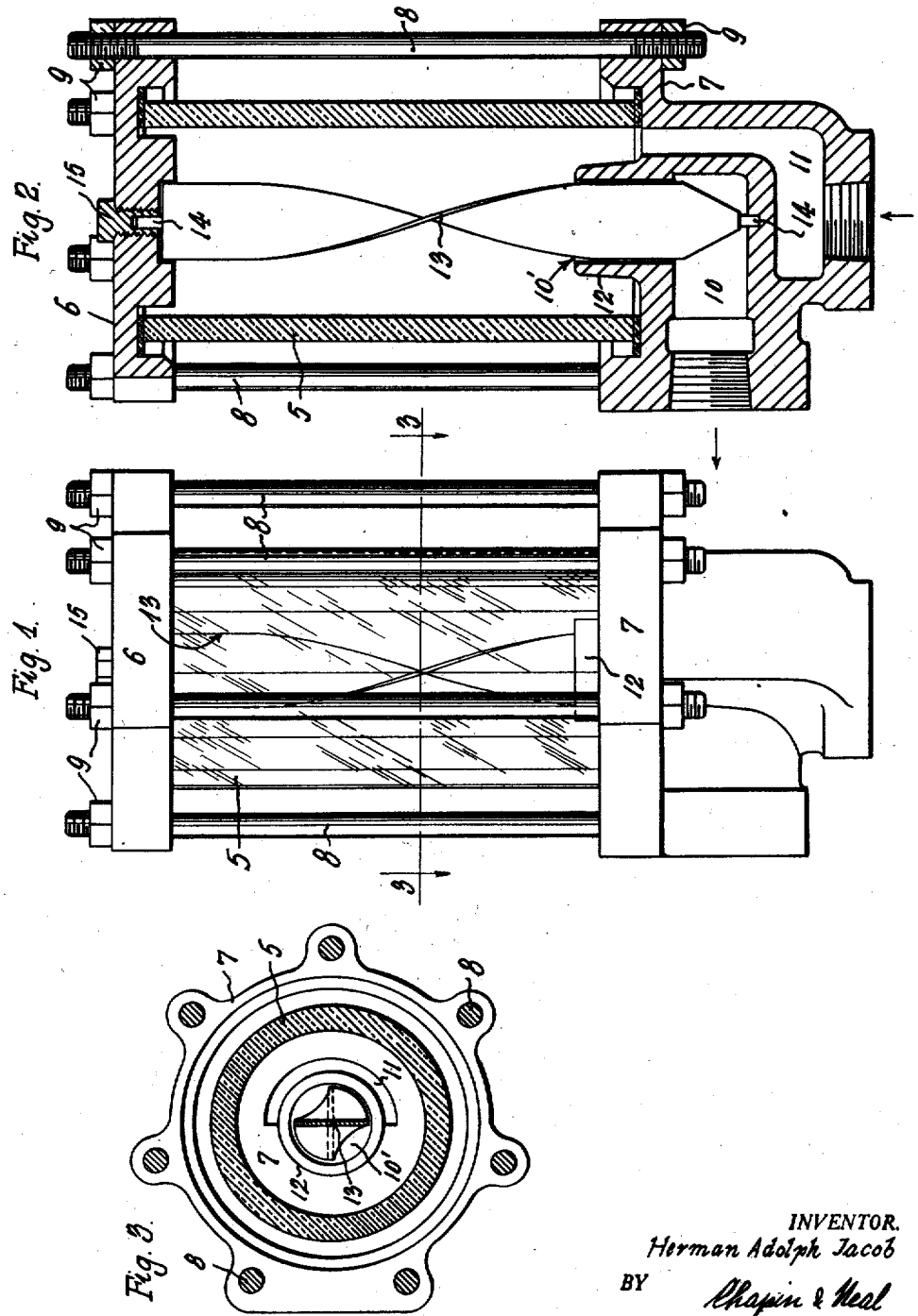
INVENTOR.
Herman Adolph Jacob
BY
Chapin & Neal
ATTORNEYS.

Patented Dec. 2, 1930

1,783,379

UNITED STATES PATENT OFFICE

HERMAN ADOLPH JACOB, OF HOLYOKE, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID-DISPENSING APPARATUS

Application filed January 16, 1930. Serial No. 421,300.

This invention relates to an improved means for indicating flow of liquid, such for example as gasoline in liquid dispensing apparatus, such as dispensing pumps for example.

The invention is particularly suitable for that class of gasoline dispensing apparatus in which the discharge line, with which my flow indicator is usually associated, is normally maintained full of gasoline. The indicator includes a sight glass but, when this glass is entirely full of a substantially colorless liquid like gasoline, it appears no different than when empty. Also, the movement of the liquid cannot be observed since all parts of the sight glass are kept filled with liquid under substantial pressure. It is necessary, in order to show to the purchaser that the liquid is moving through the discharge line, to place in the sight glass some mechanical indicator which will be moved or rotated whenever liquid is flowing. Various forms of such indicators have been used and one typical example is found in U. S. Reissue Patent No. 14,702, to W. T. Hatmaker, dated Aug. 5, 1919. With an indicator of this general type the customer merely sees a vane or wheel which spins. The liquid does not appear to move in any definite direction, although it will be agitated somewhat by the spinning vane.

My invention has for its object the provision of a flow indicator for the purposes above set forth which, like those of the prior art, embodies a member rotated by the flowing liquid but which, unlike those of the prior art, produces an illusion that there is a moving column of liquid in the midst of an apparently quiescent surrounding body of liquid and that such liquid is flowing toward and into the outlet.

The invention will more particularly appear as the detailed description proceeds and will be pointed out in the appended claims.

The invention will be disclosed with reference to the accompanying drawings, in which:—

Fig. 1 is an exterior elevational view of an indicator embodying my invention;

Fig. 2 is a sectional elevational view thereof; and

Fig. 3 is a sectional plan view taken on the line 3—3 of Fig. 1.

Referring to these drawings, the indicator includes a casing made up of a tubular member 5, usually but not necessarily cylindrical, which is clamped between upper and lower caps 6 and 7, respectively, by suitable means, such as the studs 8 and nuts 9 shown. The member 5 is at least in part transparent and usually entirely so, being made of glass of a thickness sufficient to withstand the substantial pressures to which the liquid is subjected.

The lower cap 7 contains both the inlet and the outlet passages 11 and 10, respectively. There is nothing to prevent reversal of this arrangement, however, and the described inlet may be used for an outlet and the described outlet for an inlet, if desired. The passage 10 has a cylindrical part 10' which opens into the lower end of cylinder 5 and which is formed in a boss 12 upstanding from the top of cap 7. The axis of the part 10' is parallel to that of cylinder 5. The part 10' may also be concentrically disposed with respect to the cylinder, as shown, which arrangement is usually preferable for appearance's sake, but not otherwise essential.

Within the cylinder 5, there is rotatably mounted an indicator of any suitable form and the lower portion of this indicator extends into the cylindrical part 10'. Such portion is helically formed and closely fits the cylindrical part 10', working therein like the rotor of a turbine,—the pit for which is constituted by the part 10'. As shown, the indicator consists of a spirally twisted strip 13 of metal having at its ends trunnions 14 which are mounted in suitable bearings, one in cap 6 and one in cap 7. The prime necessity for the helical formation of the indicator is in connection with that portion thereof which works in the passage 10'. The remainder of the strip need not necessarily be helically formed but, preferably, is so formed in order to secure the best results so far as the illusion, above referred to, is concerned.

Means are provided for venting the upper end of the cylinder 5 to rid the same of air during the initial filling of the apparatus. Any suitable means may be used for this purpose. Since the vent is used only infrequently, I have utilized for the purpose a screw 15 which also serves as a bearing for the upper trunnion 14. By loosening or, if necessary, removing this screw during the initial filling of the device, substantially all air may be expelled therefrom. The cylinder 5, having been filled, the screw 15 is replaced and, under ordinary conditions, no air will thereafter enter the cylinder. Consequently, it normally remains filled with liquid.

The flow indicator, above described, is usually used in connection with a liquid dispensing apparatus of the "wet hose" type wherein the discharge line, under normal conditions, is entirely filled with liquid. The inlet 11 is connected to the outlet of the dispensing apparatus and the outlet 10 to the flexible discharge hose,—deliveries being controlled by a valve at the discharge end of the hose. For example, the flow indicator may be considered as applied in place of the indicator shown in U. S. Patent No. 1,722,985, to Kling, dated July 30, 1929, which shows one type of "wet hose" dispensing apparatus with which the invention may be used.

In operation, the cylinder 5 will be substantially completely filled with gasoline and, to the purchaser, it presents the same appearance as if empty. Were the element 13 omitted, the purchaser would not be able to tell whether or not the liquid is moving in cylinder 5. By the use of element 13, an indication of the moving fluid is given. The liquid flowing down through part 10′ will, by its action on the helically formed element 13, rotate the same. In the present case, the liquid flow between the inlet and outlet is probably concentrated near the lower end of the cylinder 5 and the upper part is substantially quiescent. In any event, the liquid appears quiescent except for a central core which is agitated by the upper part of the rotating element 13. This element is much smaller in diameter than cylinder 5 and there will be a substantial annular body of unstirred liquid surrounding the rotary element. The effect produced is that of a moving stream within an encompassing body of apparently quiescent liquid. To the purchaser, it appears as if this stream were moving downwardly directly in line with the outlet passage 10, notwithstanding that the actual flow may be concentrated near the base of cylinder 5. The indication given is not only a pleasing and attractive one, as compared to those given by former indicators with which I am familiar, but it has more meaning and is readily understood by the purchaser. The best effect is obtained with the liquid flowing in the direction stated. This arrangement is therefore preferred, although it is not necessarily essential for all purposes because a measure of the advantages of the invention can be had with a reversal of the described arrangement.

It is to be noted also that where both inlet and outlet are arranged at the lower end of a single cylinder, reliance cannot be placed on any flow through the cylinder for the purpose of turning the spirally twisted strip indicator. Therefore, a pit or well 10′ has been formed in the base of the cylinder which closely fits the lower end of the indicator. The action of the liquid on the indicator to turn the same occurs in this pit and the rest of the indicator is used to produce the above described illusion. Since both inlet and outlet are formed in the base cap 7, the cylinder 5 must be larger and cannot closely fit the indicator so as to enable it to be turned by the liquid in the cylinder, as might be done if the inlet and outlet were arranged at opposite ends of the cylinder.

The invention has been disclosed herein, in an embodiment at present preferred, for illustrative purposes but the scope of the invention is defined by the appended claims rather than by the foregoing description.

What I claim is:

1. In a flow indicator, a casing comprising a tubular member of transparent material held between two end caps, one of which has inlet and outlet passages for the liquid and the other of which is normally entirely closed, one of said passages having a part which opens into the interior of said casing and has its axis disposed substantially parallel with that of said member, and an indicator rotatably supported within said casing and visible through the transparent member thereof, said indicator having a portion extending into said part of the last named passage and so formed as to be rotated by the liquid passing therethrough.

2. A flow indicator, comprising, a glass cylinder, end caps between which the cylinder is clamped, one of said caps having inlet and outlet passages for the liquid and one of said passages having a cylindrical part of the axis of which parallels the axis of the glass cylinder, and an indicator rotatably mounted within said cylinder and having a helically formed part extending into said cylindrical part of the last named passage, the diameter of said indicator being substantially less than that of said cylinder.

3. A flow indicator, comprising, upper and lower caps, a glass cylinder clamped therebetween, said lower cap having both an inlet and an outlet passage for liquid, means associated with the upper cap for venting said cylinder during the initial filling of the same, said means being normally closed and said upper cap being otherwise closed against inflow or outflow of liquid, one of said passages having an upstanding cylindrical part the axis of which is parallel to the axis of the cylinder and which opens into the same, and a spirally twisted indicator strip of substantially less diameter than the cylinder rotatably supported within the same so as to be visible therethrough and extending into said cylindrical part to be rotated by the liquid passing therethrough, the upper portion of said rotating strip serving to agitate the body of liquid contained in said cylinder in parts which would otherwise appear quiescent and produce the illusion of a downwardly moving column of liquid in the midst of a surrounding quiescent body of liquid.

In testimony whereof I have affixed my signature.

HERMAN ADOLPH JACOB.

a spirally twisted indicator strip of substantially less diameter than the cylinder rotatably supported within the same so as to be visible therethrough and extending into said cylindrical part to be rotated by the liquid passing therethrough, the upper portion of said rotating strip serving to agitate the body of liquid contained in said cylinder in parts which would otherwise appear quiescent and produce the illusion of a downwardly moving column of liquid in the midst of a surrounding quiescent body of liquid.

In testimony whereof I have affixed my signature.

HERMAN ADOLPH JACOB.

CERTIFICATE OF CORRECTION.

Patent No. 1,783,379.  Granted December 2, 1930, to

HERMAN ADOLPH JACOB.

It is hereby certified that error appears in the printed specification of the above numbered patent requiring correction as follows: Page 2, line 111, claim 2, strike out the word "of"; and that the said Letters Patent should be read with this correction therein that the same may conform to the record of the case in the Patent Office.

Signed and sealed this 6th day of January, A. D. 1931.

(Seal)

M. J. Moore,
Acting Commissioner of Patents.

CERTIFICATE OF CORRECTION.

Patent No. 1,783,379.                                  Granted December 2, 1930, to

HERMAN ADOLPH JACOB.

It is hereby certified that error appears in the printed specification of the above numbered patent requiring correction as follows: Page 2, line 111, claim 2, strike out the word "of"; and that the said Letters Patent should be read with this correction therein that the same may conform to the record of the case in the Patent Office.

Signed and sealed this 6th day of January, A. D. 1931.

(Seal)

M. J. Moore,
Acting Commissioner of Patents.